United States Patent
Ramanujam et al.

(10) Patent No.: US 7,232,476 B2
(45) Date of Patent: Jun. 19, 2007

(54) APPARATUS FOR SCUM REMOVAL

(75) Inventors: Ramamoorthy A. Ramanujam, Tamil Nadu (IN); Krishnasami Thirumaran, Tamil Nadu (IN); Rajendran Arumugam, Tamil Nadu (IN)

(73) Assignee: Council of Scientific and Industrial Research, New Delhi (IN)

( * ) Notice: Subject to any disclaimer, the term of this patent is extended or adjusted under 35 U.S.C. 154(b) by 406 days.

(21) Appl. No.: 11/022,931

(22) Filed: Dec. 28, 2004

(65) Prior Publication Data
US 2006/0137531 A1    Jun. 29, 2006

(51) Int. Cl.
*B01D 19/02*   (2006.01)

(52) U.S. Cl. ............................ 96/177; 96/217; 95/242; 210/523; 435/301.1; 366/328.1

(58) Field of Classification Search .................. 96/177, 96/176, 178, 180, 217; 95/242, 157; 210/525, 210/528, 523, 221.1, 221.2; 435/301.1; 209/168; 366/328.1, 325.92; 422/225
See application file for complete search history.

(56) References Cited

U.S. PATENT DOCUMENTS

| | | | | |
|---|---|---|---|---|
| 1,109,979 A | * | 9/1914 | Ford | 106/222 |
| 2,274,658 A | * | 3/1942 | Booth | 210/703 |
| 2,311,527 A | * | 2/1943 | Frantz et al. | 209/168 |
| 4,349,355 A | * | 9/1982 | Lingappa et al. | 48/111 |
| 5,352,421 A | * | 10/1994 | Smith et al. | 423/220 |
| 5,527,475 A | * | 6/1996 | Smith et al. | 210/787 |
| 2002/0096475 A1 | * | 7/2002 | Menke et al. | 210/703 |

FOREIGN PATENT DOCUMENTS

| | | | |
|---|---|---|---|
| JP | 06210296 A | * | 8/1994 |
| JP | 2002348948 A | * | 12/2002 |
| WO | WO 03/045526 A1 | * | 6/2003 |
| WO | WO 03/095061 A1 | * | 11/2003 |

\* cited by examiner

*Primary Examiner*—Duane Smith
*Assistant Examiner*—Douglas J. Theisen
(74) *Attorney, Agent, or Firm*—Nixon & Vanderhye P.C.

(57) ABSTRACT

An apparatus for scum removal is disclosed wherein toothed paddle induces turbulent effect on the fluids present in the reactor by means of its rotary motion. This results in both breaking and radial displacement of the scum, accumulated on the fluid during the course of the biochemical or chemical reaction, towards the outlet of the reactor, thereby ensuring that the reaction continues in scum free environment uninterruptedly.

5 Claims, 1 Drawing Sheet

APPARATUS FOR SCUM REMOVAL

FIELD OF THE INVENTION

Figure 1:
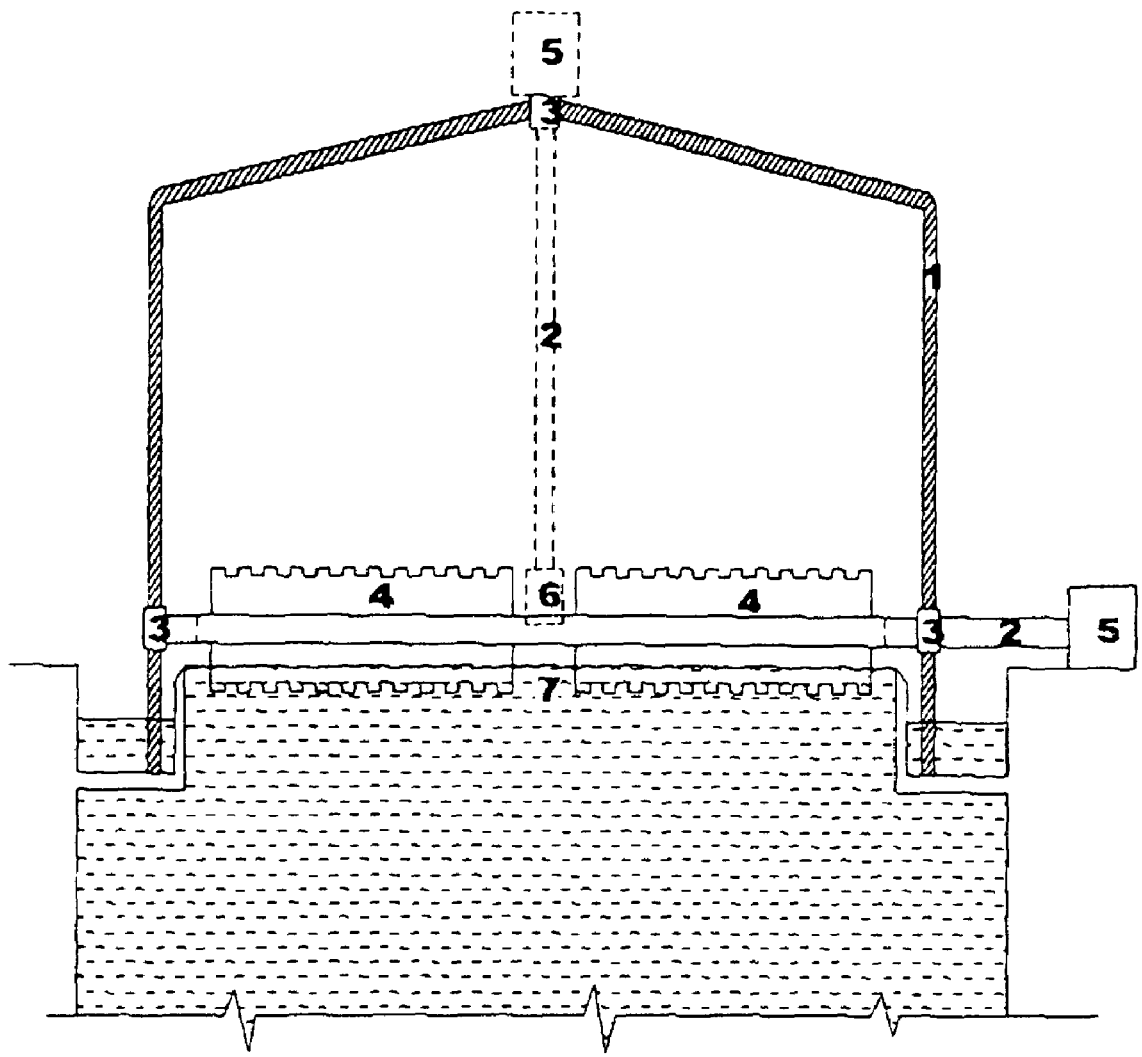

The present invention relates to a novel apparatus for scum removal for industrial application. More particularly, the present invention relates to an apparatus for incorporating in a reactor for destruction and removal of scum and foam, generated therein during the course of reactions. The apparatus of the invention has tremendous application in biochemical and chemical industries for sustaining reactions, which are otherwise likely to get slowed down or terminated due to the formation of scum in the system. It also finds potential application in wastewater treatment plants and solid waste treatment digesters.

BACKGROUND OF THE INVENTION

Scum is essentially a frothy substance formed in reactors during the course of any biochemical or chemical reaction and is responsible for hindering the reaction rate. The reaction even gets terminated with the accumulation of scum in the reactor. This has been a serious problem of much concern for any biotechnological and chemical industry. Treatment of wastewater and industrial effluent through biological process has attained much focus in the present day scenario. Formation of scum during the course of waste treatment poses a major challenge to the environmental scientists too.

The performance of biochemical/biotechnological process depends mainly on the organic constituents, essentially of lipid, protein and carbohydrates present in the feed material. In the case of wastes treatment, industrial and municipal solid wastes are in general mixtures of biodegradable and non-biodegradable matters and the organic matter contents in the raw feed fluctuate widely. In view of the fluctuations in the constituents of the organic matter, and variation in organic loading rates to the reactors, scum formation and foam generation are bound to take place within the digester. The scum layer formed on the surface of liquid aids foaming when the gas evolution rate is high. The accumulation of foam in the gas space inside the reactors prevents the release of gas from the liquid and also the flow of gas from the reactor to the gas collection facility. The formation of scum layer and foaming leads to increase of backpressure inside the reactor and causes discharge of scum and foamy materials through the overflow arrangement of the reactor. In this situation the reactor cannot be operated at the designed feed rate. The feeding can be resumed only after removal of foam and scum layer from the reactor. This has prompted research into providing options to carry out aforesaid reactions in scum free environment to ensure that reaction is not hindered.

Reference is made to Lingappa et al (U.S. Pat. No. 4,349,355 9, 1982), who worked on Methane generator wherein the gas collector slidably mounted in the upper portion of the generator is provided with rods that extend downward through slotted retainer into the organic material for agitating the organic material within the liquid slurry. The characteristic feature of the system is that the scum formed on the surface is only pierced by the rods and its effect is intermittent as the rate of movement of rods again depends on the rate of gas production and the rotating movement of to and fro in the slots causes piercement of scum only in the surface area covered by the slots where the rods are rotating and the remaining area is undisturbed. The major limitation associated with this arrangement is that it does not remove scum from the surface and it aids gas production only in the area where the surface is pierced and other areas the scum builds up on the surface.

Reference is made to Tamura Tadao (JP6210296, 08, 1994), who worked on scum removal device of purification tank, wherein scum removal device ejects pressurised water to remove the scum only from the wall surface of the overflow trough. The major limitation is that this device does not effectively remove the scum from the surface of liquid where the scum is generated in the purification tank, as the blowing pressurised water cannot cover the entire liquid surface area and physically break the entire scum layer for its efficient removal along with overflow water.

Reference is made to Abe Takao et al (JP2002348948, 12, 2002), who worked on a scum removal system wherein the scum removal device removes the scum in the sewerage. The major drawback is that this system is not provided with any arrangement to break the scum formed in the liquid surface or prevent the scum formation.

Reference is made to Tuomikoski Pekka (WO03045526, 06, 2003), who worked on apparatus for removal of surface scum wherein a scraper assembly pushes the surface scum or supernatant sludge in a rectangular settling tank or clarification basin. The apparatus described is designed only to scrap the scum from the surface to the discharge point. The major limitation associated with this is that this apparatus operates only to push the scum formed on the surface towards the discharge point and it does not have any arrangement to prevent scum formation on the liquid surface itself where the scum layer is formed.

Reference is made to Tuomikoski Pakka (WO03095061, 11, 2003), who worked on apparatus for the removal of surface scum in a circular processing space wherein the surface rake fitted with mechanical aerating device enhances the passage of floating scum to the outlet mechanism in a circular processing space such as settling tank or the like. The major drawback is that this apparatus does not break the scum or prevent formation of scum layer.

In hitherto known devices main drawbacks are inadequate components in the apparatus to prevent formation of scum layer leading to incomplete removal of scum from the liquid surface. In hitherto known devices attempts have been made only to enhance passage of floating scum to the discharge point but not prevention of scum layer formation.

OBJECTS OF THE INVENTION

The main object of the present invention is to provide a novel apparatus for scum removal for industrial application, which obviates the limitation as stated above.

Another object of the present invention is to eliminate building up of the foam and to eliminate the formation of scum blanket.

Still another object of the present invention is to renew the surface to aid release of gas from liquid phase.

Yet another object of present invention is to enhance the separation of gas from solid and liquid phase in the reactor.

SUMMARY OF THE INVENTION

Accordingly, the present invention provides an apparatus for scum removal for industrial application, which comprises a toothed paddle arm (4) supported on a shaft (2) and connected to the shaft (2), provided with bearing (3), the shaft being connected to a reversible prime mover (5), the whole attachment being incorporated on liquid reactants (7) contained inside a conventional reactor (1), the drive being driven by a reversible prime mover (5) from a source (not shown in figure), and transmitted through shaft-bearing arrangement, the rotary motion horizontally to the paddle or vertically through a transmission mechanism (6), to the paddle, thereby displacing scum radially to the outlet of the reactor.

In an embodiment of the present invention, the teeth in the toothed paddle arm is positioned at a pitch of 5-30 cm.

In another embodiment of the present invention the prime mover is selected from an electric motor, which can rotate in clockwise and anticlockwise directions to simultaneously revolve the toothed paddle in clockwise or anticlockwise directions.

In yet another embodiment of the present invention, the transmission mechanism is selected from belt drive, rope drive, gear drive.

In still another embodiment of the present invention the angle of positioning of the shaft-bearing-prime mover with respect to the axis of the reactor is either 0° or 90°.

BRIEF DESCRIPTION OF ACCOMPANYING DRAWING

FIG. 1 represents a cross-section of the apparatus for scum removal. The components of FIG. 1 are referenced by the following numerals:

1 refers to conventional reactor
2 refers to shaft
3 refers to bearing
4 refers to toothed paddle arm
5 refers to prime mover
6 refers to transmission mechanism
7 refers to liquid reactants

DETAILED DESCRIPTION OF THE INVENTION

The apparatus of the invention will now be described with reference to the accompanying drawing in FIG. 1.

The apparatus of the present invention comprises of toothed paddle arm (4) supported on a shaft connected to the shaft (2), provided with bearing (3). The shaft is connected to a reversible prime mover (5) and the assembly of shaft-bearing-prime mover is positioned at an angle of 0° or 90° with respect to the axis of the reactor in which it is intended to be incorporated. The whole attachment is incorporated on the liquid reactants (7) contained inside a conventional reactor (1). The drive, driven by the reversible prime mover (5) from a source (not shown in the drawing), transmits through shaft-bearing arrangement the rotary motion horizontally to the paddle or vertically through a transmission mechanism (6), to the paddle, that displaces the scum radially to the outlet of the reactor.

The inventive step of the present invention lies in the incorporation of the toothed paddle, which, drawing its rotary motion from the prime mover through the shaft, induces turbulent effect on the fluids present in the reactor, resulting in breaking and radial displacement of the scum, accumulated on the fluid during the course of the biochemical or chemical reaction, towards the outlet of the reactor, thereby ensuring the reaction to continue in scum free environment uninterruptedly.

The following examples are given by way of illustration only and therefore should not be construed to limit the scope of the present invention.

EXAMPLE —I

A scum removal apparatus having toothed paddle of length 30 cm, width 5 cm and the teeth positioned at 30 cm pitch was fixed horizontally in a biomethanation reactor of 1.0 m diameter and 1.0 m height, which was found to produce 2-7 $g/m^3$ of scum layer having solid content of 25 to 35 percent and specific gravity of the scum between 0.93-0.95.

The shaft-bearing-prime mover was positioned at an angle of 90° with respect to the axis of the reactor. The paddle was rotated at a speed of 2 rpm once in an hour continuously for a period of 2 minutes using gear drive sourced from a reversible electric motor, which rotated in clockwise and anticlockwise directions to simultaneously revolve the toothed paddle in clockwise or anticlockwise directions. The turbulence created in the liquid contained in the reactor by the rotation of the paddle was found to break the scum and displace it radially to the outlet of the reactor. Thus the reaction in the reactor continued uninterruptedly.

The scum removal efficiency was 90% and the rate of gas release from the surface has increased by 15%. The variation observed in the gas production for an organic loading rate of 1.5 kg $VS/m^3$.d was ±1%.

EXAMPLE—II

A scum removal apparatus having toothed paddle of length 30 cm, width 7.5 cm and the teeth positioned at 15 cm pitch was fixed horizontally in a biomethanation reactor of 1.0 m diameter and 1.0 m height, which was found to produce 7-12 $g/m^3$ of scum layer having solid content of 35 to 45 percent and specific gravity of the scum between 0.93-0.95.

The shaft-bearing-prime mover was positioned at an angle of 0° with respect to the axis of the reactor. The paddle was rotated at a speed of 5 rpm once in an hour continuously for a period of 3 minutes using rope drive sourced from a reversible electric motor, which rotated in clockwise and anticlockwise directions to simultaneously revolve the toothed paddle in clockwise or anticlockwise directions. The turbulence created in the liquid contained in the reactor by the rotation of the paddle was found to break the scum and displace it radially to the outlet of the reactor. Thus the reaction in the reactor continued uninterruptedly.

The scum removal efficiency was 93% and the rate of gas release from the surface has increased by 15%. The variation observed in the gas production for an organic loading rate of 2.5 kg $VS/m^3$.d was ±1%.

EXAMPLE—III

A scum removal apparatus having toothed paddle of length 30 cm, width 5 cm and the teeth positioned at 20 cm pitch was fixed horizontally in a biomethanation reactor of 1.0 m diameter and 1.0 m height, which was found to produce 2-7 $g/m^3$ of scum layer having solid content of 25 to 35 percent and specific gravity of the scum between 0.93-0.95.

The shaft-bearing-prime mover was positioned at an angle of 90° with respect to the axis of the reactor. The paddle was rotated at a speed of 2 rpm once in an hour continuously for a period of 2 minutes using belt drive sourced from a reversible electric motor, which rotated in clockwise and anticlockwise directions to simultaneously revolve the toothed paddle in clockwise or anticlockwise directions. The turbulence created in the liquid contained in the reactor by the rotation of the paddle was found to break the scum and displace it radially to the outlet of the reactor. Thus the reaction in the reactor continued uninterruptedly.

The scum removal efficiency was 90% and the rate of gas release from the surface has increased by 16%. The variation observed in the gas production for an organic loading rate of 1.5 kg VS/m$^3$.d was ±1%.

EXAMPLE—IV

A scum removal apparatus having toothed paddle of length 30 cm, width 7.5 cm and the teeth positioned at 5 cm pitch was fixed horizontally in a biomethanation reactor of 1.0 m diameter and 1.0 m height, which was found to produce 7-12 g/m$^3$ of scum layer having solid content of 35 to 45 percent and specific gravity of the scum between 0.93-0.95.

The shaft-bearing-prime mover was positioned at an angle of 0° with respect to the axis of the reactor. The paddle was rotated at a speed of 5 rpm once in an hour continuously for a period of 3 minutes using belt drive sourced from a reversible electric motor, which rotated in clockwise and anticlockwise directions to simultaneously revolve the toothed paddle in clockwise or anticlockwise directions. The turbulence created in the liquid contained in the reactor by the rotation of the paddle was found to break the scum and displace it radially to the outlet of the reactor. Thus the reaction in the reactor continued uninterruptedly.

The scum removal efficiency was 98% and the rate of gas release from the surface has increased by 18%. The variation observed in the gas production for an organic loading rate of 2.5 kg VS/m$^3$.d was ±1%.

ADVANTAGES

The main advantages of the present invention are the following.
1. The apparatus of the present invention enhances the efficiency of the process being carried out in a reactor.
2. It is simple to operate, less expensive, easy to maintain and suitable for all kinds of solid/liquid wastes.
3. The installation of the scum removal system in the reactors/digesters would eliminate accumulation of foam and formation of scum blanket and aid release of gas from the liquid surface.
4. The surface renewal caused by the device would enhance the rate of release of gas from the reactor.
5. The rate of generation of gas would become consistent, which would result in more efficient utilisation of gas for energy recovery in the downstream equipment.

We claim:

1. An apparatus for scum removal for industrial application, the apparatus comprising a plurality of toothed paddle arms (4) supported on a shaft (2) and connected to the shaft (2), the shaft being provided with a bearing (3), the shaft being connected to a reversible prime mover (5), the toothed paddle arms, shaft and bearing being incorporated in a mixture of liquid and solid reactants (7) contained inside a reactor (1), the reversible prime mover (5) driving a drive from a source and transmitted through the shaft-bearing arrangement, rotary motion being transmitted horizontally to the paddle or vertically through a transmission mechanism (6), to the paddle, thereby displacing the scum radially to the outlet of the reactor.

2. An apparatus as claimed in claim 1, wherein the toothed paddle arms are provided with teeth positioned at a pitch of 5-30 cm.

3. An apparatus as claimed in claim 1, wherein the prime mover is an electric motor, rotatable in clockwise and anticlockwise directions to simultaneously revolve the toothed paddle in clockwise or anticlockwise directions.

4. An apparatus as claimed in claim 1, wherein the transmission mechanism is selected from the group consisting of a belt drive, rope drive and a gear drive.

5. An apparatus as claimed in claim 1, wherein the shaft-bearing-prime mover is positioned at an angle with respect to the axis of the reactor of either 0° or 90°.

* * * * *